United States Patent [19]

Stix et al.

[11] Patent Number: 4,767,590
[45] Date of Patent: Aug. 30, 1988

[54] ANOMALOUS - VISCOSITY CURRENT DRIVE

[75] Inventors: Thomas H. Stix, Princeton; Masayuki Ono, Princeton Junction, both of N.J.

[73] Assignee: The United States of America as represented by the United States Department of Energy, Washington, D.C.

[21] Appl. No.: 855,568

[22] Filed: Apr. 25, 1986

[51] Int. Cl.$^4$ ................................................. G21B 1/00
[52] U.S. Cl. ...................................... 376/133; 376/126
[58] Field of Search ................. 376/121, 126, 133, 136

[56] References Cited

U.S. PATENT DOCUMENTS 3,831,101  8/1974  Benford et al. ...................... 376/126

OTHER PUBLICATIONS

Furth et al., "Tearing Mode in the Cylindrical Tokomak," Phys. Fluids 16, p. 1054 (1973).
Stix, "Current Penetration and Plasma Disruption," Phys. Rev. Letters 36, p. 521 (1976).
Stix, "Plasma Transport Across a Braided Magnetic Field," Fusion 18, p. 3 (1978).
Ono et al., "Electron-Beam Injection Experiment in Act-1 for Tokomak Start-Up and Current Dr.," Bull. Am. Phys. Soc. 27, p. 967 (1982).

*Primary Examiner*—Deborah L. Kyle
*Assistant Examiner*—Richard L. Klein
*Attorney, Agent, or Firm*—Paul A. Gottlieb; Judson R. Hightower

[57] ABSTRACT

An apparatus and method for maintaining a steady-state current in a toroidal magnetically confined plasma. An electric current is generated in an edge region at or near the outermost good magnetic surface of the toroidal plasma. The edge current is generated in a direction parallel to the flow of current in the main plasma and such that its current density is greater than the average density of the main plasma current. The current flow in the edge region is maintained in a direction parallel to the main current for a period of one or two of its characteristic decay times. Current from the edge region will penetrate radially into the plasma and augment the main plasma current through the mechanism of anomalous viscosity.

In another aspect of the invention, current flow driven between a cathode and an anode is used to establish a start-up plasma current. The plasma-current channel is magnetically detached from the electrodes, leaving a plasma magnetically insulated from contact with any material obstructions including the cathode and anode.

19 Claims, 7 Drawing Sheets

ANOMALOUS - VISCOSITY CURRENT DRIVE

CONTRACTUAL ORIGIN OF THE INVENTION

The U.S. Government has rights to this invention pursuant to Contract No. DE-AC02-76-CH03073 between the U.S. Department of Energy and Princeton University.

BACKGROUND OF THE INVENTION

The present invention relates generally to an apparatus and method for maintaining a steady state current in a plasma for magnetically confining the plasma in a toroidal magnetic confinement plasma device such as a tokamak. More particularly, the present invention relates to a method and apparatus for maintaining a steady-state current for magnetically confining the plasma in a toroidal magnetic confinement device using anomalous viscosity current drive. A second aspect of this invention relates to an apparatus and method for the start-up of a magnetically confined toroidal plasma.

The apparatus for toroidal magnetic confinement that is most popular in controlled fusion research today is the tokamak device. But, as is widely recognized, the standard tokamak is inherently a pulsed devise. The magnetic-field-aligned, predominantly toroidal, plasma current, essential for tokamak plasma confinement, is, in the standard tokamak, driven by electromagnetic induction. However, a number of means have been proposed to enable steady-state tokamak current drive. To date, the most successful of such means is lower-hybrid radio-frequency current drive, but the efficiency of radio-frequency current drive is projected to be marginal for a fusion reactor. The present invention pertains to a method and apparatus for driving a steady-state current in a magnetically confined plasma, such as a tokamak plasma, that may prove to be of superior efficiency for a fusion reactor.

For a classical axisymmetric magnetically confined toroidal plasma, there is no mechanism within resistive magnetohydrodynamic (MHD) theory to balance the electron-ion friction associated with plasma of current flow other than the presence of a toroidal electric field. But the latter can be established inside the tokamak plasma only by magnetic induction, a process inconsistent with steady-state operation. If steady-state current drive is to be created, it must involve forces which do not appear in the usual Ohm's Law, such as injected high-Z ions, or resonant electrons (radiofrequency drive), or mean-field terms that have their origin in non-axisymmetric phenomena. Anomalous viscosity for plasma current flow is just such a non-axisymmetric phenomenon and can be described in mathamatical terms by adding just such a mean field term to Ohm's Law.

In more detail, Furth et al., Phys. Fluids 16, 1054 (1973), have demonstrated that a strong current on the edge of a plasma will trigger the double-tearing instablilty, provided the direction of flow of this edge current is parallel to that of the interior plasma current. The process of magnetic reconnection or of magnetic turbulence associated with this instability then facilitates the rapid radial penetration of the properly directed edge current. Rapid current penetration due to the double-tearing instability has been suggested by Furth et al. (op. cit) and by Stix, Phys. Rev. Letters 36, 521 (1976). This penetration can be modeled by adding to Ohm's Law a new term describing the meanfield behavior of the instability-driven turbulence. The effective shear viscosity associated with the effect of magnetic turbulance or of magnetic reconnection on magnetic-field-aligned plasma current flow will hereinafter be referred to as anomalous shear viscosity for current flow or more simply, just as anomalous viscosity. For a detailed discussion of this model a reference is made to Stix, Nucl. Fusion 18, 3 (1978).

Ono et al., Bull. Am. Phys. Soc. 27,967 (1982), demonstrated in an experiment performed on the ACT-1 plasma facility that an electron beam produced by an electrode system could be used to produce a highly ionized plasma. It should be understood, however that this ACT-1 experiment used the electrode system in a substantially different manner than the electrode system used in the present invention, as discussed below in

DETAILED DESCRIPTION OF THE INVENTION.

Therefore, in view of the above, it is an object of the present invention to provide an apparatus and method for maintaining a steady-state plasma current in a toroidal magnetically confined plasma.

It is another object of the present invention to provide an apparatus and method for maintaining a steady-state current in a toroidal magnetic confinement plasma device, the apparatus and method having a higher efficiency than radiofrequency current drive.

It is another object of the present invention to provide an apparatus and method for maintaining a steady-state plasma current in a toroidal magnetic confinement plasma device using anomalous shear viscosity to achieve preferential penetration of properly-directed magnetic-field-aligned plasma current.

It is still another object of this invention to provide an apparatus and method for creating a toroidal magnetically confined plasma, ab initio, in a toroidal magnetic confinement device.

Additional objects, advantages and novel features of the invention will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects in accordance with the purposes of the present invention, as embodied and broadly described herein, the present apparatus and method for maintaining a steady-state plasma current in a toroidal magnetic confinement plasma device may comprise a toroidal vaccuum chamber within which is a magnetically confined toroidal plasma and means for producing and maintaining the flow of electric current in an edge region at or near the outermost good magnetic surface of the toroidal plasma. Theoretical calculations indicate that the density of current flow in the edge region should be greater than the average density of main current flow and that the current flow in the edge region should be maintained in a direction parallel to the main current for a period of one or two current decay times. Current from the edge region will penetrate radially into the plasma due to magnetic reconnection and/or magnetic turbulence and will augment or maintain the main current through the mechanism of anomalous viscosity.

In another aspect of the invention, current flow driven between a cathode and an anode is used to establish a start-up plasma current. The start-up current is generated in a magnetic field which has a strong toroidal component and a weak vertical component. The plasma current channel is detached from the electrodes by quickly changing the vertical component of the magnetic field. The detached current channel results in a toroidal plasma which is magnetically insulated from contact with any material obstructions including the cathode and anode.

DETAILED DESCRIPTION OF THE INVENTION

To further understand the present invention, it should be realized that the trajectories of the ions and electrons in a plasma tend very closely to follow or "stick to" the lines of magnetic force. Therefore, it is helpful to describe the character of the lines of magnetic force in a toroidal magnetic confinement device. The "secret" of toroidal magnetic confinement is that the magnetic lines of force in a region of good toroidal magnetic confinement never encounter material objects; therefore plasma particles, whose trajectories tend to follow these lines, do not encounter material objects either. These particles and the plasma they comprise are therefore "magnetically confined" or "magnetically insulated".

Explaining the magnetic configuration that gives rise to good toroidal magnetic confinement, one may observe that as the lines of magnetic force in an ideal toroidal magnetic confinement device, such as an ideal tokamak, proceed around the toroid, they actually spiral slowly in a helical manner around one single magnetic line, this special single line being the "magnetic axis". The "magnetic axis" is that line of magnetic force that closes upon itself after going only once around the toroid. Under ideal conditions, the "magnetic axis" would be just a simple circle threading the "center" of the toroidal plasma.

Continuing the explanation of the magnetic geometry for toroidal plasma confinement, the volume throughout which a good magnetic confinement configuration can be achieved in any practical device is necessarily limited in spatial extent. The outside surface of this volume is called the "outermost good magnetic surface" and is the imaginary surface generated by the outermost unobstructed line of magnetic force that—after going many many times around the toroid—closes or almost closes upon itself.

The volume that lies inside the vacuum vessel but outside the outermost good magnetic surface is called the "scrape-off" region. Obstructions that magnetic lines may encounter in the scrape-off region will include the plasma limiter (i.e., the "scraper") as well as other material objects such as electrodes, coils, diagnostic devices and structural components of the vacuum vessel. Plasma will be present in the scrape-off volume as well as in the volume interior to the outermost good magnetic surface, but the plasma particles in the scrape-off region will relatively quickly strike material obstructions and this portion of the plasma inside the vacuum vessel will not benefit from optimum toroidal magnetic confinement or from optimum magnetic insulation.

We will hereinafter refer to the plasma situated interior to the outermost good magnetic surface as the "main plasma" and the magnetic-field-aligned current that flows in the main plasma will hereinafter be referred to as the "main current". And we will hereinafter refer to the vicinity of the outermost good magnetic surface as the "edge" region of the plasma. The edge region will lie principally outside the outermost good magnetic surface in the "scrape-off" region, but it may also be considered to extend somewhat inside this same surface, into the region occupied by the main plasma.

Reference will now be made to the preferred embodiment of the present invention, examples of which are illustrated in the accompanying drawings.

Figure 1:
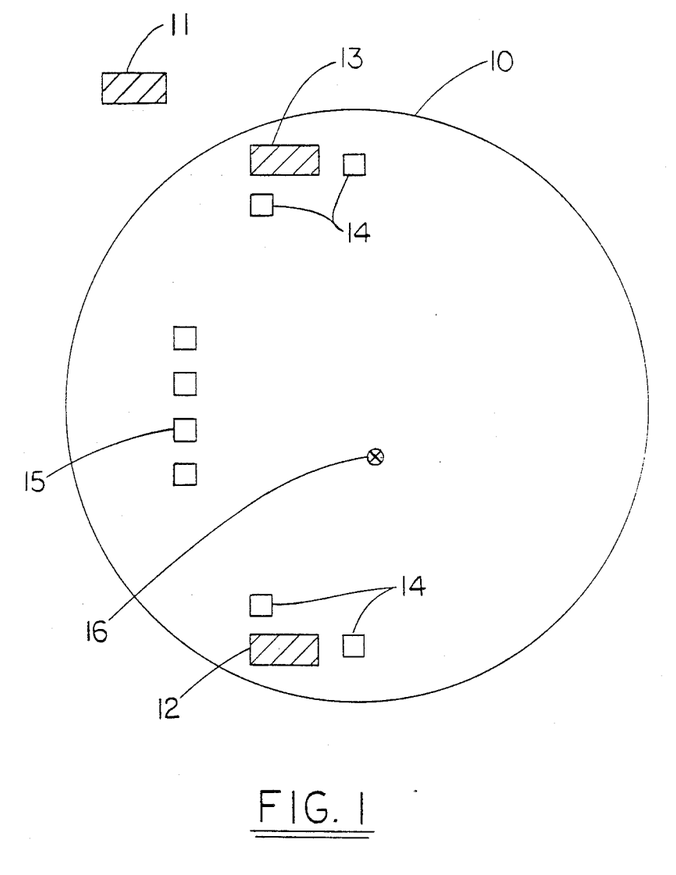
FIG. 1 is a cross-sectional view of the toroidal confinement plasma device of the present invention using electrodes.

Referring to FIG. 1, cathode 12 and anode 13 are disposed within the plasma confinement torus 10 and are energized by energizing means 11. Divertor coils 14 are disposed near the cathode 12 and anode 13. Shaping coils 15 are also disposed within the plasma confinement torus 10. The toroidal magnetic field, B, is represented by 16.

Figure 2:
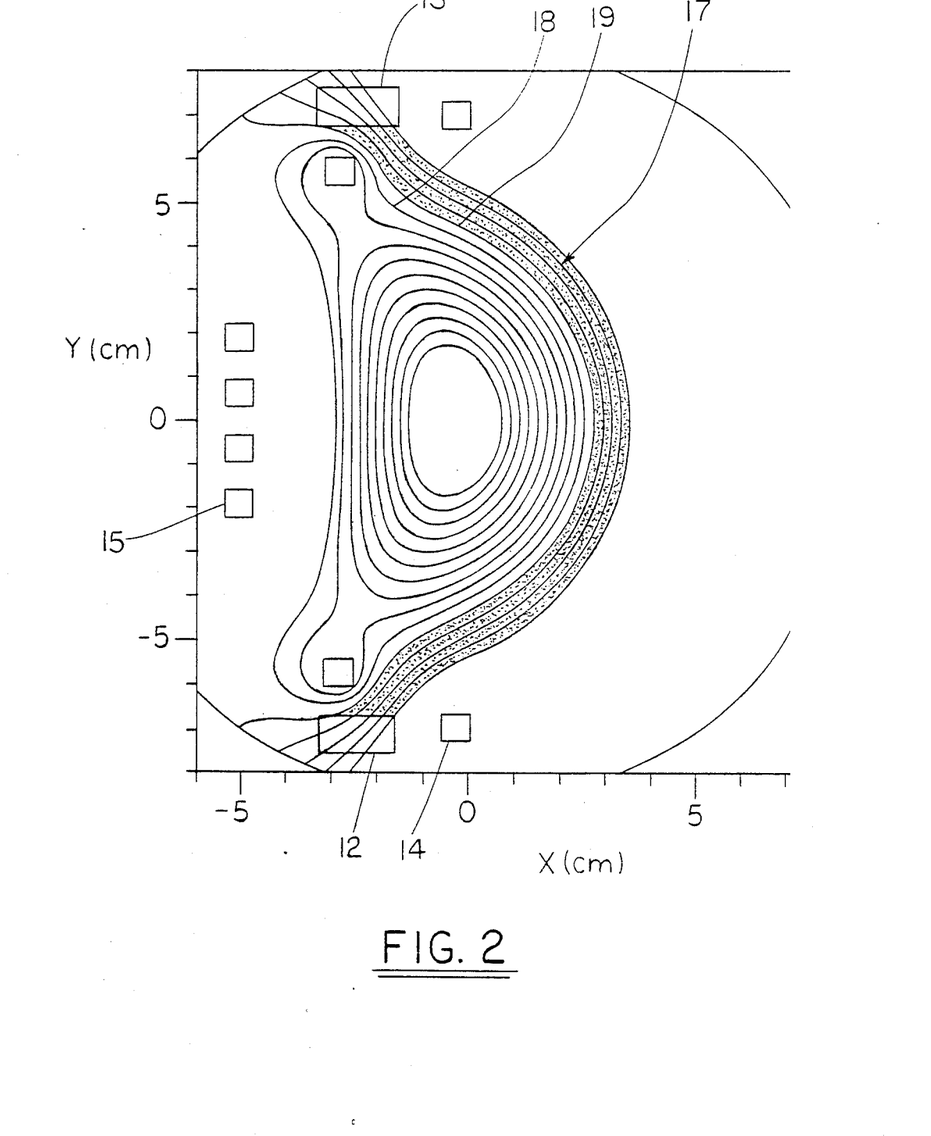
FIG. 2 shows the calculated poloidal flux contours for a discharge with I=1250 amperes for the device of FIG. 1.

FIG. 2 shows the calculated poloidal flux contours for a discharge current equal to 1250 amperes for the device of FIG. 1. As shown in FIG. 2, flux contour line 18 is the last unobstructed line of magnetic flux which closes or almost closes upon itself. This condition defines the last good line of magnetic flux and that line, followed many many times around the torus, generates the outermost good magnetic surface. Contour lines 19 are interrupted by a material surface, in this instance, a cathode or anode. The scrape-off region in this illustration is the region outside of contour line 18 and cathode 12 and anode 13 are disposed in the scrape-off region. Now, like plasma particles, plasma current tends strongly to flow along the magnetic lines of force. Thus, current flowing between cathode 12 and anode 13 in FIG. 2 is also disposed in the scrape-off region.

The current flowing between cathode 12 and anode 13 will trigger the double-tearing instability only if its direction of flow is parallel (and not anti-parallel) to that of the main current. The region 17 through which this edge current flows is depicted by the shaded region outside the outermost good magnetic surface 18. One criterion for the onset of the double-tearing mode is that the profile of the safety factor, q(r), be double valued in r [that is, that q(r) takes on the same value at two different values of r]. A quick calculation for cylindrical geometry shows that this situation will occur if the density of axial current flow in a cylindrical shell exceeds the average density of axial current flow through the cross-section of the cylinder within that shell. Thus, the double-tearing mode will be driven unstable if the average density of current flow in the shell region is made greater than the average density of current-flow in the main tokamak current channel.

It is the double-tearing mode that can provide the anomalous viscosity needed for rapid current penetration. This viscosity can be described mathematically by adding a mean-field term to Ohm's Law. Physically speaking, it is the kinetic momentum of the injected electrons that replaces the momentum lost through electron-ion collisions, and it is the anomalous viscosity that allows this momentum to move inward in minor radius, into the hot interior of the toroidal tokamak plasma. Thus, the plasma current will be augmented by the amount of current which penetrates radially inward from the edge current region 17.

Figure 3:
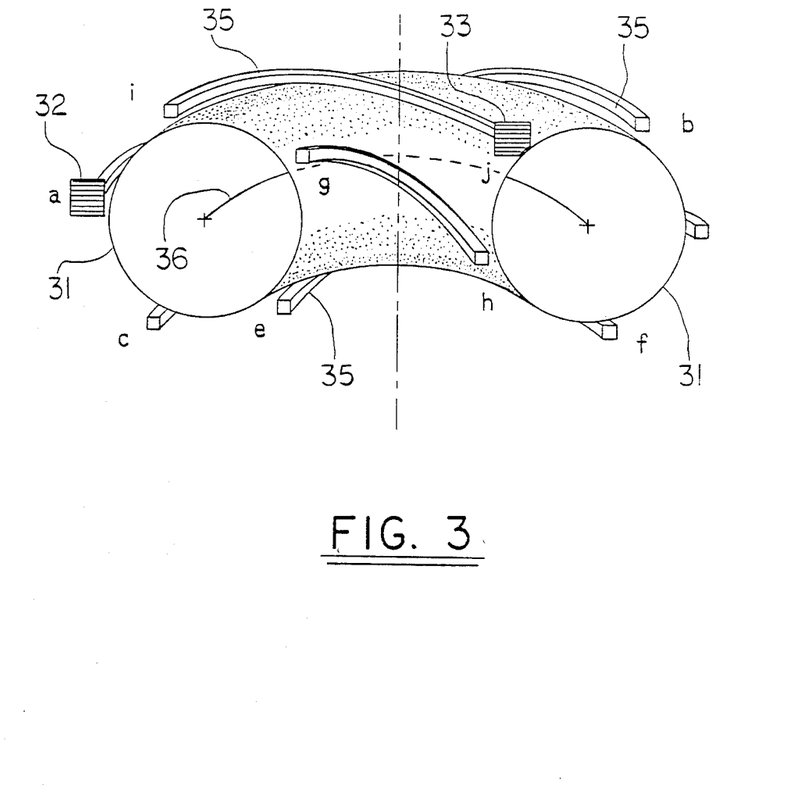
FIGS. 3(a) and 3(b) show an arrangement of the present invention wherein a limiter is used as an anode.

FIG. 3 shows another preferred embodiment of the present invention. The plasma 31 is restricted in minor radius by a fractional limiter 33. That is, by a limiter that intercepts only a fraction of the magnetic lines of force in the scrape-off region, just outside the outermost good magnetic surface. Limiter 33 is here made the anode of an electrode system, and one or mor cathodes 32 are placed in the scrape-off region, close to the outermost good magnetic surface. The cathodes 32 are disposed so that they can emit electrons only in the direction parallel to the direction of average electron flow in the main current channel. After leaving a cathode 32, electrons follow along the lines of magnetic force 35, spiral slowly around the magnetic axis 36, and circumnavigate the torus several times before hitting the anode 33. In FIG. 3, an imaginary plane bisects the plasma torus and only the more distant half is shown. Successive intersections of the spiralling electron beam are designated by letters a–j. Thus, in the present embodiment, the edge current region forms a toroidal shell that envelopes the toroidal main plasma. A suitable cathode material is lanthanum hexaboride ($L_aB_6$).

Figure 4:
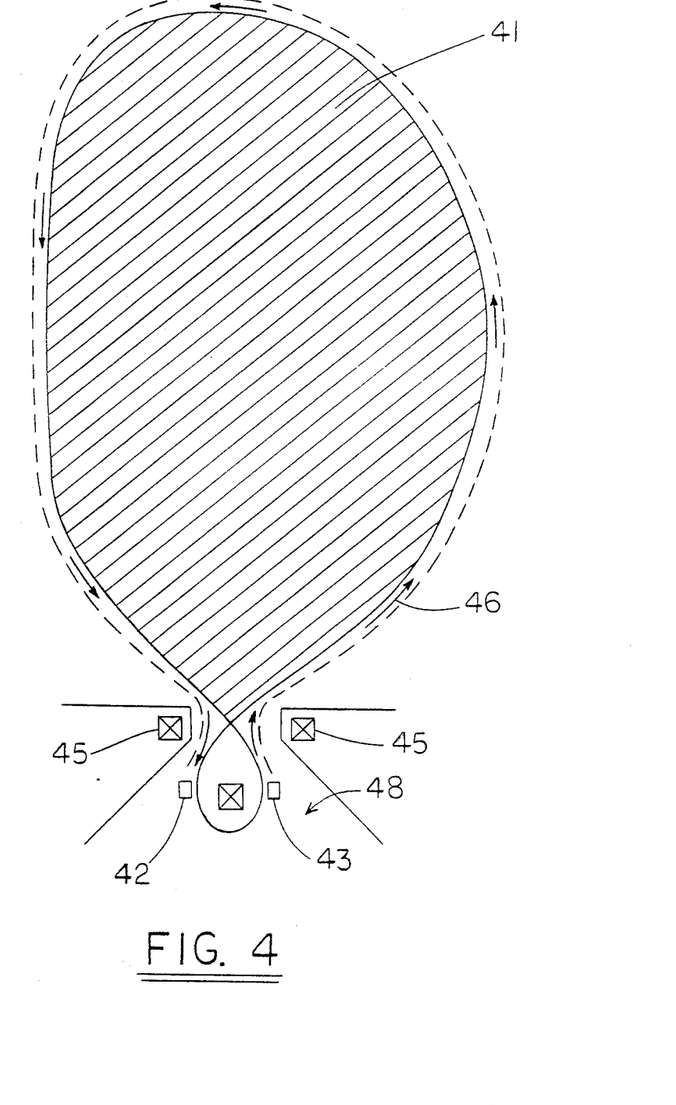
FIG. 4 shows an arrangement of the present invention using electrodes, where the electrodes are placed in a divertor region.

FIG. 4 shows another preferred embodiment of the present invention wherein the cathode 43 and the anode 42 are disposed within divertor chamber 48. Divertor coils 45 are arranged such that a divertor x-point is created. This x-point is defined as the point where there is a null in the poloidal maqnetic field. Arrows 46 represent the electron beam path which follows the lines of magnetic force and, again in this embodiment, spirals slowly around the main plasma current channel, circumnavigates the main plasma 41, but eventually re-enters the divertor region and strikes anode 42.

In an experiment performed on the ACT-1 toroidal plasma facility, cited in BACKGROUND OF THE INVENTION, it was demonstrated that a low-voltage 200-ampere beam with current density on 100 amperes/$cm^2$, could be readily achieved. The experiment made use of a lanthanum hexaboride ($L_aB_6$) cathode which was biased about 300 volts negative with respect to the limiter chamber walls. The current density in a tokamak reactor would have approximately the same value. While Ono et al. recite the use of an electrode system to inject a beam of electrons into a toroidal confinement device, the present invention differs substantially from the ACT-1 experiment described therein. The ACT-1 device was not a tokamak and did not utilize a plasma current to achieve optimum magnetic confinement of the plasma. Ono et al. described the injection of an electron beam directly into a target plasma. The electron beam discharge broke down the background gas to form a highly ionized plasma. Ono et al. further recite that radiofrequency current drive means can be used to drive a steady-state current in the plasma formed by the injected electron beam. Thus, the ACT-1 experiment demonstrated that an electrode system could be used to form a highly ionized plasma but did not show that the electrode system could be used to generate a steady-state current in the plasma.

The present invention differs from the experiment described by Ono et al., in that the electrode-system would produce an edge region of electric current flow outside of a previously formed, highly ionized plasma. The density of the edge current flow will be sufficiently large, the direction of the edge current will be parallel to that of the main current, and the edge current will be maintained for a sufficient time such that it may penetrate radially into the main plasma by magnetic reconnection or magnetic turbulence. The penetrating current then auguments or maintains the main current of the toroidal plasma.

The attraction associated with the preferred embodiments of the present invention described above is that they are totally non-inductive. The electrode system of the above-described preferred embodiments can be energized such that a constant current flows between the cathode and the anode. Alternatively, the electrode system can be pulsed at regular intervals, producing current flow in the scrape-off region parallel to that in the main channel.

Figure 5A:
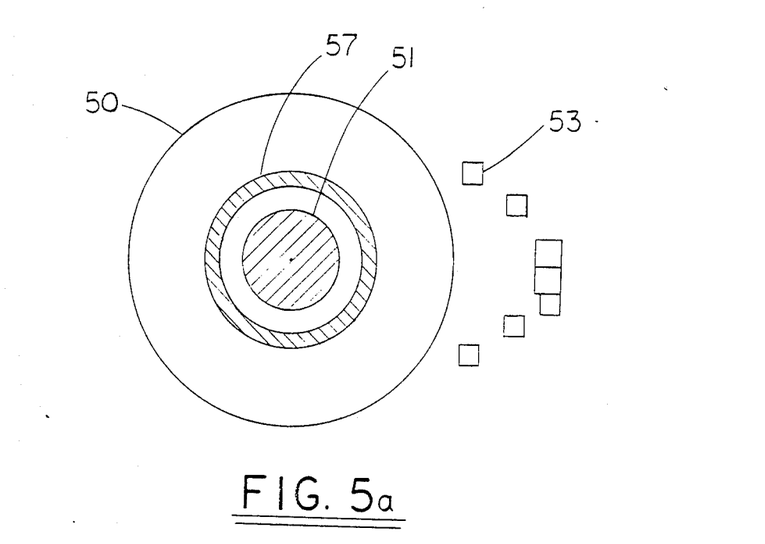
FIGS. 5(a) and 5(b) show arrangements of the present invention, using induction coils to drive a current in an edge region that comprises a toroidal shell enveloping the main plasma.
Figure 5B:
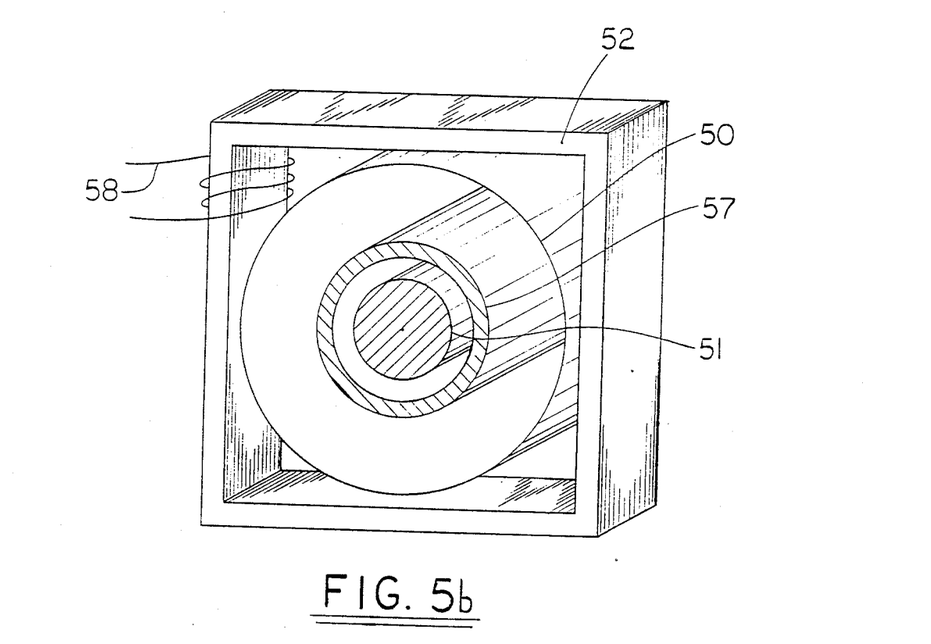

FIGS. 5(a) and 5(b) show another preferred embodiment of the present invention. Edge current 57 is produced external to plasma 51 by electromagnetic induction. The transformer for producing edge current 57 may comprise coils 53. Coils 53 may themselves comprise toroidal rings disposed around the main plasma torus 50. A conventional tokamak ohmic heating transformer and its associated coils may be used as coils 53 if they are pulsed in the appropriate manner, described below. Alternatively, the transformer for producing the edge current 57 may comprise a ferromagnetic core 52 which surrounds the minor radius of of the main plasma 51 as as depicted in FIG. 5(b). In this disposition, the edge current channel acts as the secondary circuit for the transformer while coils 58 comprise the externally driven primary windings, corresponding to coils 53 in FIG. 5(a).

The inductive coils 53 or 58 may be pulsed repeatedly in a manner such that negative and positive increments of current of comparable magnitude are induced on the plasma surface, but only the positive increment is able to turn on the double-tearing instability, which then provides rapid radial penetration for the properly-directed incremental current. By transporting to a region of lower resistivity just the incremental current flowing in one direction, the plasma itself is able to rectify transformer-induce alternating currents.

In more detail, consider a tokamak that is already carrying it's equalibrium plasma current, $I_o$, and consider further that there is no current flowing in the primary circuit of the ohmic heating trasformer. Say then that each new transformer pulse now starts by ramping up the transformer's primary current so that it reaches a value $I_1$. The transformer induces an incremental current $I_2$ equal to $-I_1$ in the plasma, initially on the surface of the plasma torus, which is to flow in a toroidal sense opposite to that of the main plasma current $I_o$. Say now that the primary current in the transformer, $I_1$, is then maintained for one or two decay times for the induced incremental plasma surface current. A decay time is here defined as the inductance of the current channel in the plasma divided by its resistance, $L/R$.

After $I_2$ has undergone appreciable decay, $I_1$ is driven suddenly back to zero. A new induced counter-current, $I_2' = I_1$ appears at the plasma surface. $I_2'$ now flows in the same toroidal sense as $I_o$, and the magnitude of the current density associated with $I_2'$ is to be sufficient to drive the double-tearing mode or a similar instability. The instability and associated plasma turbulence tend to flatten the plasma current profile and, in so doing, let some fraction of $I_2'$ penetrate rapidly radially inward, to the hotter core region of the plasma that is much less resistive and where the rate of current decay is correspondingly much reduced. The situation is now that the primary current in the transformer is back to its initial value, zero, but the main plasma current, $I_o$, is increased by the absorbed fraction of $I_2'$. The driving force for the unidirectional plasma current is the turbulence-associated viscosity, not the toroidal electric field, and while negative and positive increments of current of comparable magnitude have been induced on the plasma surface ($I_2$ and $I_2'$), rectification occurs because only the positive increment has been able to turn on the instability which offers rapid radial penetration for the incremental current.

Referring to the preferred embodiments of the present invention as illustrated in FIGS. 1-4, the electrode system comprising the cathode and the anode may also be pulsed at regular intervals, as described above. Plasma rectification will occur by the same process as that described above for inductive means. The pulse shape and duration must be sufficiently ramped and long, respectively, that instability is not triggered before the counter-current induced on the plasma surface has been largely able to decay away. The final average density of current-flow in the scrape-off region must once more be sufficient to drive the double-tearing mode, which then again provides the mechanism for rapid radial current penetration for some fraction of the incremental current.

Figure 6:
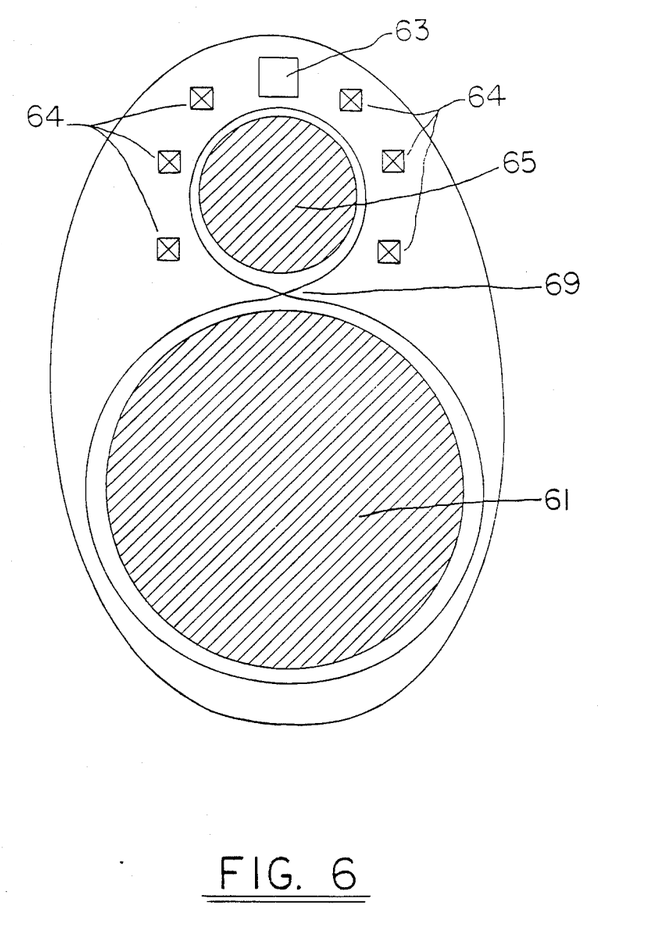
FIG. 6 shows an arrangement of the present invention using inductive means to drive current in a toroidal ringlet, that is, in an auxiliary toroidal region of small cross-section, the auxiliary region being immediately adjacent to the main plasma.

FIG. 6 illustrates another preferred embodiment of the present invention. A transformer 63 located in the scrape-off region is pulsed to create a current ringlet 65 in the scrape-off region. The ringlet current should flow in the same toroidal direction as the main plasma current. The fundamental poloidal magnetic field in the scrape-off region is shaped to permit the creation of this ringlet, which is itself a "mini-tokamak". Moreover, the magnetic fields of the ringlet transformer 63 should not be linked to the main tokamak plasma 61, and the main plasma current need not be significantly affected by creation of the ringlet 65. As illustrated in FIG. 6, current ringlet 65 is generated near the main plasma 61. Means are provided for pushing the ringlet 65 toward the main plasma. These means may comprise shaping coils 64. The ringlet 65 is pushed toward the main plasma, which process creates an x-point 69, and ringlet 65 is held there while resistive magnetic reconnection takes place, shifting the ringlet current from its original zone to the edge region enveloping the the main tokamak plasma. At this stage, the incremental current is situated in the edge region and forms a shell of current around the plasma 61 similar to the shell of current created by the preferred embodiments illustrated in FIGS. 3, 4 and 5. The discussion of current penetration via double-tearing and/or anomalous viscosity applies then to this case too.

Figure 7A:
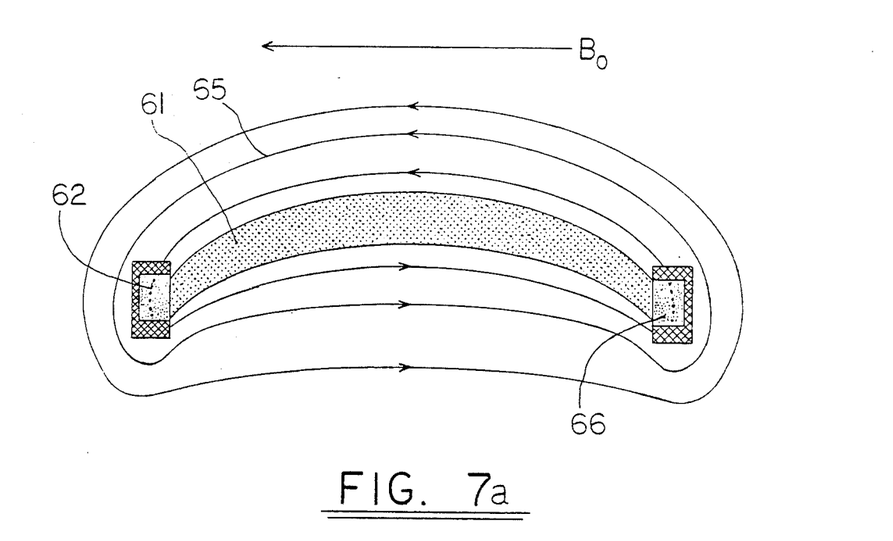
FIG. 7(a) shows electrodes, coils, and poloidal magnetic field lines associated with driving current through a region that, at this stage, is still in contact with both a cathode and anode.
Figure 7B:
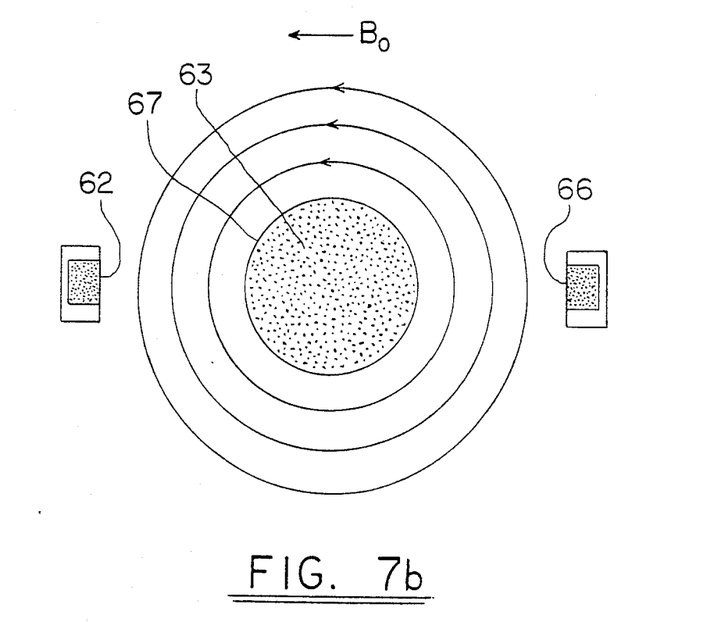
FIG. 7(b) shows the current detached from the electrodes after changing the vertical field strength. The plasma and current flow pattern that was originally in contact with cathode and anode is now on the interior of a good magnetic surface and is isolated from contact with any material obstruction.

In the preferred embodiments discussed up to this point, an incremental current generated in an edge region is caused to penetrate the primary or main current channel of the tokamak, the mechanism for penetration being anomalous viscosity. The incremental current then adds to or augments the main current. Alternatively, the main current itelf may be started up ab initio by using a cathode and anode as illustrated in FIGS. 7(a) and 7(b). A coaxial pair of toroidal electrodes consisting of cathode 62 and anode 66 is immersed in a magnetic field that is primarily toroidal but which has a small "vertical" component, $B_0$, directed parallel to the major axis of the system. The electrodes are energized so that electrons, emitted from the cathode, flow in a slowly rising spiral or helicoidal paths that carry them from the cathode to the anode. After switch-on of the electrode circuit, the magnitude of the current flowing between cathode and anode will rise and approach a steady-state value. This steady-state value may even be so large that reversal of the "vertical" magnetic field occurs locally, on one side of the current channel 61. The poloidal projection of the magnetic field lines 65 would then appear as in FIG. 7a.

Next, by quickly changing the amount of current being driven through the coils (not shown in FIG. 7) that produce the "vertical" field, the strength of that vertical field, $B_0$, would itself be changed quickly to a new value, $B_0'$. [The change in the strength of the vertical field should be carried out within a time period short compared to the characteristic inductive-resistive ($L/R$) decay time for the plasma-current "circuit".] The original value of the vertical field, $B_0$ would have been chosen to optimize the current flow between cathode 62 and anode 66, FIG. 7a. Its new value, $B_0'$ should be selected to provide a force equilibrium for the configuration depicted in FIG. 7b, such that the "motor force" between the plasma current and the new verticle field, $B_0'$, just balances the self-expansive force, that is, the "hoop force", of the plasma current loop. The external circuit supplying current to the cathode-anode system may, at this point, be switched open (save for voltage-transient protective devices) and the plasma current channel 61 will spontaneously deform itself into iths new equilibrium configuration 63, shown schematically in FIG. 7b.

The plasma current channel 63 has now been magnetically detached from the cathode 62 and anode 66 and is closed upon itself, no longer requiring the addition or subtraction of current from external sources such as cathodes or anodes. Region 63, occupied by the main plasma current channel, fills the volume interior to the outermost good magnetic surface 67, and is a region of good magnetic insulation and good magnetic surfaces.

It is possible that the processes of anomalous viscosity, magnetic turbulence and magnetic reconnection may be activated by the quick change of vertical field strength described above, and that these "nonclassical" processes will actually hasten the magnetic detachment of the plasma current channel from the material electrodes and enhance the transition to the new equilibrium.

It may be understood that alternative means may be used to perform the magnetic detachment of the current channel from the cathodes and anodes. The magnetic field component that performs this detachment may be generated not only by changing the current in the vertical field coils, but also by changing the current in special auxiliary coils that are optimally disposed and programmed to perform the funciton of magnetic detachment of the plasma current channel from the anode-cathode electrode structure. Moreover, during build-up of the electrode current and in performing the transition from the electrode-current phase to the magnetically insulated equilibrium phase, the currents in the vertical field coils and in other coils carrying currents that affect the poloidal magnetic field may all be programmed in time, in direction and in amplitude to effect an orderly build-up and transition and to achieve desired new equilibrium configurations for the magnetic field and for the plasma.

Summarizing, an anode-cathode system is so disposed in a mainly toroidal magnetic field that, when these electrodes are energized, a plasma is created and a strong toroidal current is generated. Next, the strength of the "vertical" field is intentionally changed, causing the current channel to seek a new equilibrium configuration. In this process, the current channel carries all or most of the plasma with it as it moves. Provided the vertical field has been programmed correctly, this sequence of events will cause the plasma current channel and all or most of the plasma originally situated in region 61 of anode-cathode plasma current flow, FIG. 7a, to be moved into region 63, FIG. 7b, a region of good magnetic surfaces and good magnetic insulation. The plasma current channel and plasma, now in region 63, are no longer in contact with any material objects. In particular, the plasma current channel and plasma in region 63 are now magnetically insulated from material contact with cathode 62 or with anode 66.

This apparatus and method may be used to generate the "start-up" plasma in a conventional toroidal magnetic confinement plasma device such as a "standard" tokamak. The method has the advantages that neither an ohmic heating transformer nor radiofrequency plasma heating nor radiofrequency current drive means are required for its implementation. It should be noted in particular that the use of conventional ohmic heating for "start-up" places severe technological and economic demands on the electrical and structural design of the vacuum vessel and on other apparatus associated with large tokamaks, and the avoidance of this requirement would be considered a strong engineering boon.

In addition, it should be mentioned that the startup plasma, after its full creation as depicted in FIG. 7b, could, if desired, be maintained by the methods of steady-state current drive, including the means of anomalous viscosity current drive. For this purpose, the apparatus and methods described in the preferred embodiments of this invention could be used.

The disclosed apparatus and method thus provide a system for generating a steady-state toroidal plasma current in a toroidal plasma current in a toroidal confinement plasma device. The disclosed apparatus and method provide a system for generating a steady-state plasma current without using radiofrequency current generating methods. Further, the disclosed apparatus and method provide a system for creating a magnetically confined plasma, ab initio in a toroidal magnetic confinement device.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. In a tokamak, which includes a toroidal vacuum chamber and a magnetically confined main plasma disposed therein, and a scrape-off region disposed between said main plasma and said vacuum chamber, said main plasma having an edge region and a main current, wherein the improvement comprises:
    means for generating and maintaining an electric current having a current density greater than the average current density of said main current, in the edge region of said main plasma, said edge current being maintained in a direction parallel to said main current for a period of the order of one edge current decay time, wherein said edge current flowing in the direction of said main current, will penetrate radially into said main plasma thereby augmenting and maintaining said main current.

2. The system of claim 1 wherein the means for generating and maintaining said edge current comprises:
    a cathode disposed in the plasma scrape-off region and and anode disposed in the plasma scrape-off region such that said edge current is driven only in the same toroidal sense as that of the main current, and energizing means for energizing said anode and said cathode such that the edge current generated therefrom has a current density greater than the average current density of said main current.

3. The system of claim 2 wherein said energizing means is a repeatedly pulsed energizing means, such that said cathode and said anode generate said edge current in a repeatedly pulsed manner.

4. The system of claim 2 wherein said energizing means is a steady-state energizing means, such that said cathode and said anode generate and edge current which is steady-state in time.

5. The system of claim 2 wherein said cathode material comprises lanthanum hexaboride (LaB$_6$).

6. The system of claim 2 wherein said cathode and said anode are disposed in a position to allow said edge current to flow in a toroidal shell, said toroidal shell enveloping said main plasma.

7. The system of claim 6 wherein said cathode and said anode are disposed in said scrape-off region such that they function as plasma limiters.

8. The system of claim 2 further including a divertor and a divertor region, said cathode and said anode being disposed in said divertor region.

9. The system of claim 1 wherein said means for generating and maintaining said edge current comprises an inductive transformer disposed without said main plasma.

10. The system of claim 9 wherein said inductive transformer comprises a coil and means for energizing said coil.

11. The system of claim 10 wherein said coil is a loop disposed substantially coaxial with said toroidal main plasma.

12. The system of claim 9 wherein said inductive transformer comprises a ferromagnetic transformer core and a primary coil operatively associated therewith, said ferromagnetic core surrounding the minor radius of said main toroidal plasma.

13. The system of claim 9 wherein said inductive transformer is operable in a repeatedly pulsed manner as to produce edge currents alternatingly flowing in opposite toroidal senses, and wherein said edge current flowing in the same toroidal sense as that of the main plasma current will preferentially penetrate into said main plasma.

14. The system of claim 1 wherein said means for generating and maintaining said edge current are operable to produce said edge current in a toroidal ringlet, said ringlet being disposed immediately adjacent to said toroidal main plasma, and further comprising: means for creating a null point in said poloidal magnetic field, said null point disposed between said main plasma and said toroidal ringlet, and means for driving said edge current across said null point.

15. The system of claim 14 wherein said means for creating a null point in said poloidal magnetic field comprises a divertor, wherein said null point is the divertor x-point, said divertor creating said scrape-off region.

16. The system of claim 14 wherein said means for generating and maintaining said toroidal ringlet comprises an inductive transformer.

17. A method for maintaining a steady-state toroidal plasma current in a tokamak, said tokamak including a toroidal vacuum chamber and a magnetically confined main plasma disposed therein, and a scrape-off region disposed between said main plasma and said vacuum chamber, main plasma having an edge region and a main current, which comprises the steps of:
(a) generating an electric current in said edge region, said electric current being generated in a direction parallel to said main current and having a current density greater than the average density of said main current; and
(b) maintaining said edge current for a period of the order of one edge current decay times, wherein said edge current flowing in the direction of said main current will penetrate radially into said main plasma thereby augmenting and maintaining said main current.

18. The method of claim 17 wherein said edge current is generated in a toroidal shell, said toroidal shell enveloping said main plasma.

19. The method of claim 17 wherein said edge current is generated in a toroidal ringlet, said ringlet being disposed immediately adjacent to said toroidal main plasma, further comprising the steps of:
creating a null point in said poloidal magnetic field, said null point being disposed between said main plasma and said toroidal ringlet; and driving said edge current across said null point.

* * * * *